US012567658B2

(12) United States Patent
Chu et al.

(10) Patent No.: US 12,567,658 B2
(45) Date of Patent: Mar. 3, 2026

(54) SECONDARY BATTERY

(71) Applicant: LG ENERGY SOLUTION, LTD.,
Seoul (KR)

(72) Inventors: Sung Min Chu, Daejeon (KR); Jae Won Lim, Daejeon (KR)

(73) Assignee: LG ENERGY SOLUTION, LTD.,
Seoul (KR)

( * ) Notice: Subject to any disclaimer, the term of this patent is extended or adjusted under 35 U.S.C. 154(b) by 788 days.

(21) Appl. No.: 17/798,732

(22) PCT Filed: Apr. 5, 2021

(86) PCT No.: PCT/KR2021/004227
§ 371 (c)(1),
(2) Date: Aug. 10, 2022

(87) PCT Pub. No.: WO2021/206393
PCT Pub. Date: Oct. 14, 2021

(65) Prior Publication Data
US 2023/0079224 A1 Mar. 16, 2023

(30) Foreign Application Priority Data

Apr. 6, 2020 (KR) ........................ 10-2020-0041760

(51) Int. Cl.
*H01M 50/54* (2021.01)
*H01M 10/04* (2006.01)
(Continued)

(52) U.S. Cl.
CPC ....... *H01M 50/54* (2021.01); *H01M 10/0422* (2013.01); *H01M 50/107* (2021.01); *H01M 50/46* (2021.01); *H01M 50/474* (2021.01)

(58) Field of Classification Search
None
See application file for complete search history.

(56) References Cited

U.S. PATENT DOCUMENTS

2004/0253867 A1 12/2004 Matsumoto
2006/0263676 A1 11/2006 Chang et al.
(Continued)

FOREIGN PATENT DOCUMENTS

CN 1613158 A 5/2005
CN 101286572 A 10/2008
(Continued)

OTHER PUBLICATIONS

International Search Report (PCT/ISA/210) issued in PCT/KR2021/004227, dated Jul. 23, 2021.

*Primary Examiner* — Matthew T Martin
*Assistant Examiner* — Bartholomew A Hornsby
(74) *Attorney, Agent, or Firm* — Birch, Stewart, Kolasch & Birch, LLP

(57) ABSTRACT

A secondary battery includes an electrode assembly having a negative electrode, a positive electrode tab protruding to a first side, a negative electrode tab protruding to a second side, and a through-hole; an upper can having a flat planar portion and a circumferential portion protruding in a vertical direction along an edge of the flat planar portion; a lower can having a flat planar portion and a circumferential portion protruding in the vertical direction along an edge of the flat planar portion; and a center pin configured to apply elastic force in the vertical direction when being inserted into the through-hole. The center pin applies the elastic force to allow the negative electrode tab to be in direct contact with the lower can and allow the positive electrode tab to be in direct contact with the upper can.

11 Claims, 5 Drawing Sheets

(51) Int. Cl.
 H01M 50/107 (2021.01)
 H01M 50/46 (2021.01)
 H01M 50/474 (2021.01)

(56) References Cited

U.S. PATENT DOCUMENTS

| | | | |
|---|---|---|---|
| 2006/0275666 A1 | 12/2006 | Chang et al. | |
| 2009/0130544 A1 | 5/2009 | Chang et al. | |
| 2009/0246605 A1 | 10/2009 | Chang et al. | |
| 2012/0015224 A1 | 1/2012 | Pytlik et al. | |
| 2015/0372339 A1 | 12/2015 | Pytlik et al. | |
| 2017/0025703 A1 | 1/2017 | Pytlik et al. | |
| 2017/0365874 A1 | 12/2017 | Pytlik et al. | |
| 2020/0083497 A1* | 3/2020 | Sabrowsky ....... | H01M 10/0427 |
| 2020/0185755 A1 | 6/2020 | Pytlik et al. | |
| 2020/0194820 A1 | 6/2020 | Pytlik et al. | |
| 2020/0212473 A1 | 7/2020 | Pytlik et al. | |
| 2020/0212474 A1 | 7/2020 | Pytlik et al. | |

| | | | |
|---|---|---|---|
| 2021/0175535 A1 | 6/2021 | Pytlik et al. | |
| 2022/0209279 A1 | 6/2022 | Pytlik et al. | |
| 2022/0352581 A1* | 11/2022 | Eguchi ............... | H01M 50/109 |

FOREIGN PATENT DOCUMENTS

| | | | | | |
|---|---|---|---|---|---|
| CN | 204361197 U | | 5/2015 | | |
| CN | 204632817 U | | 9/2015 | | |
| CN | 110364676 A | * | 10/2019 | ........ | H01M 10/0427 |
| CN | 110379990 A | * | 10/2019 | | |
| JP | 8-273697 A | | 10/1996 | | |
| JP | 3178586 B2 | | 6/2001 | | |
| JP | 3407973 B2 | | 5/2003 | | |
| JP | 3906872 B2 | | 4/2007 | | |
| KR | 10-2006-0115021 A | | 11/2006 | | |
| KR | 10-0659836 B1 | | 12/2006 | | |
| KR | 10-2011-0124269 A | | 11/2011 | | |
| KR | 10-1850181 B1 | | 4/2018 | | |
| KR | 10-2020-0007562 A | | 1/2020 | | |

* cited by examiner

CONVENTIONAL ART

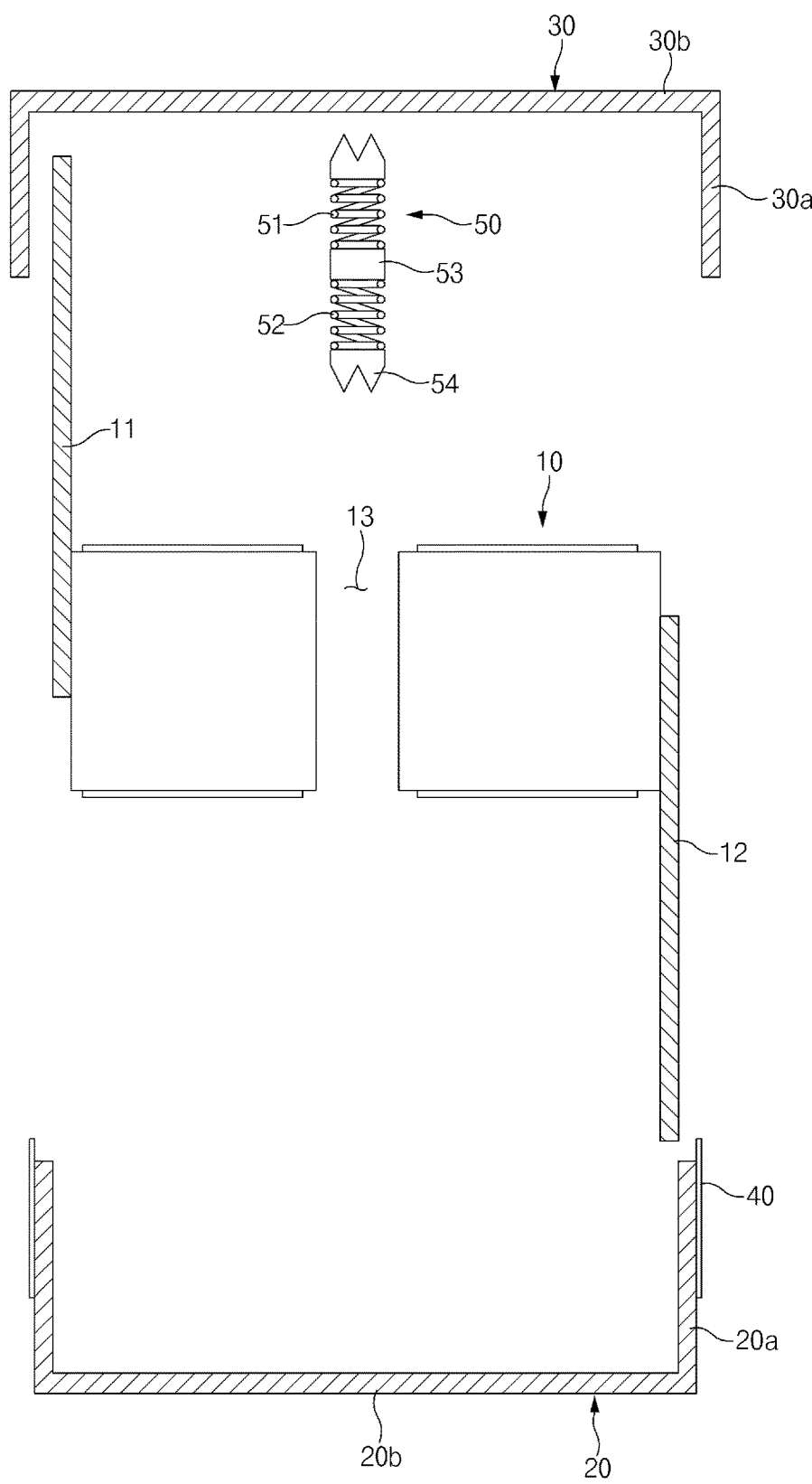
F I G . 3

SECONDARY BATTERY

TECHNICAL FIELD

The present application claims the benefit of the priority of Korean Patent Application No. 10-2020-0041760, filed on Apr. 6, 2020, which is hereby incorporated by reference in its entirety.

The present invention relates to a secondary battery, and more particularly, to a secondary battery, in which a process of welding a positive electrode tab and a negative electrode tab are respectively welded to an upper can and a lower can is removed to reduce production costs and also to reduce a defect rate due to the difficult welding process.

BACKGROUND ART

A button-type battery commonly used as a coin-type battery or a button-type battery has a thin button shape and is widely used in various devices such as remote controllers, clocks, toys, computer parts, and the like.

Such a button-type battery is mainly manufactured as a non-rechargeable primary battery, but is also widely manufactured as a secondary battery that is chargeable and dischargeable as miniaturized devices are developed. Also, the button-type secondary battery also has a structure in which an electrode assembly and an electrolyte are embedded in a case to repeatedly perform charging and discharging, like the button-type secondary battery or the cylindrical or pouch-type secondary battery.

FIG. 1 is a cross-sectional view illustrating a state in which a negative electrode tab and a lower can are welded to each other, and the positive electrode tab and an upper can are welded to each other, and then, the lower can and the upper can are bonded to each other in a process of assembling a button-type secondary battery according to the related art.

As illustrated in the drawing, the button-type secondary battery has a structure, in which an upper can 30 and a lower can 20 are bonded to each other. Here, each of the upper can 30 and the lower can 20 has a flat cylindrical shape, and the upper can 30 has a diameter slightly greater than that of the lower can 20.

An electrode assembly 10, in which a positive electrode, a separator, and a negative electrode are stacked, and an electrolyte are mounted in the lower can 20. Here, the electrode assembly 10 is configured so that a negative electrode tab 12 protruding from the negative electrode extends from a side surface of the negative electrode to protrude downward, and a positive electrode tab 11 protruding from the positive electrode extends from a side surface of the positive electrode to protrude upward.

In addition, in a state in which the extending portion of the negative electrode tab 12 is bent to be in contact with a bottom surface of the electrode assembly 10, when the electrode assembly 10 is seated on the lower can 20, an upper welding gun A enters a hole 13 formed in a center of the electrode assembly 10, and current is applied to a lower welding gun B so that the negative electrode tab 12 is bonded to the lower can 20 in a resistance welding manner.

On the other hand, the positive electrode tab 11 is welded to a bottom surface of a planar portion of the upper can 30 before being completely bent. Also, when the upper can 30 and the lower can 20 are bonded to each other, the positive electrode tab 11 is bent once more than the negative electrode tab 12 (see a structure in which the positive electrode tab is bent twice in the lower figure of FIG. 1).

In addition, the method for bonding the positive electrode tab 11 to the negative electrode tab 12 according to the related art has a problem in which each of the positive electrode tab 11 and the negative electrode tab 12 is welded to decrease in production rate. In addition, since the positive electrode tab 11 has to have a sufficient long length for the welding, the production costs may increase, and the additional bending may be performed to increase in thickness of the secondary battery.

DISCLOSURE OF THE INVENTION

Technical Problem

Therefore, an object of the present invention is to provide a secondary battery, in which the problems (reduction in production rate due to individual bonding of a positive electrode tab and a negative electrode tab, increase in product cost due to an increase in length of the positive electrode tab, and increase in thickness due to additional bending of the positive electrode tab) of the above-described structure according to the related art are capable of being solved.

Technical Solution

The present invention for achieving the above object provides a secondary battery comprising: an electrode having a positive electrode, a separator, a negative electrode, a positive electrode tab protruding to a first side, a negative electrode tab protruding to a second side, and a through-hole extending through the positive electrode, the separator, and the negative electrode, which are stacked; an upper can having a flat planar portion and a circumferential portion protruding in a vertical direction along an edge of the flat planar portion; a lower can having a flat planar portion and a circumferential portion protruding in the vertical direction along an edge of the flat planar portion, wherein the circumferential portion of the lower can is fitted in parallel with the circumferential portion of the upper can; and a center pin in the through-hole, the center pin being configured to apply elastic force in the vertical direction, wherein, in a state in which a portion of the negative electrode tab is disposed parallel to the flat planar portion of the lower can, and a portion of the positive electrode tab is disposed parallel to the flat planar portion of the upper can, when the upper can and the lower can are bonded to each other, the center pin applies the elastic force to allow the portion of the negative electrode tab to be in direct contact with the lower can and allow the portion of the positive electrode tab to be in close contact with the upper can.

The center pin may comprise one or more springs that resist compression force, and when the upper can and the lower can are bonded to each other, the compression force may be applied to the one or more springs.

The springs may comprise a first spring and a second spring, which are disposed to be connected to each other in the vertical direction by an insulator that interrupts electricity disposed between the first spring and the second spring to electrically insulate the first spring and the second spring from each other.

Each of an end of the first spring pressing the positive electrode tab and an end of the second spring pressing the negative electrode tab may have a wedge, each wedge may have a sharp shape of which a diameter gradually decreases toward an end thereof. In addition, two wedges may be disposed in parallel with each other at the end of each of the first spring and the second spring.

A length and elasticity of each of the first spring and the second spring may be determined within a range in which one or more of the positive electrode tab and the negative electrode tab are separated from the upper can or the lower can before the upper can and the lower can are completely separated from each other. When the upper can ascends by a predetermined distance from an initial position thereof bonded to the lower can, the positive electrode tab may be switched from a state in which the portion of the positive electrode tab is in direct contact with a bottom surface of the upper can into a state in which the portion of the positive electrode tab is not in contact with the bottom surface of the upper can.

A gasket that interrupts electricity may be disposed between the circumferential portion of the upper can and the circumferential portion of the lower can. The gasket may be configured to not only insulate the electricity, but also to prevent the built-in electrolyte from leaking, and to contain the adhesion component so that the upper can and the lower can adhere to each other.

In the present invention, the circumferential portion of the upper can may have a diameter greater than the circumferential portion of the lower can, the circumferential portion of the lower can may fit within the circumferential portion of the upper can, and each of the upper can and the lower can may be shaped such that a diameter of the planar portion thereof is greater than a height of the circumferential portion thereof.

The electrode assembly may have a cylindrical shape, and the through-hole may be formed at a position passing through a center of the electrode assembly. When the upper can is bonded to the lower can in a state in which the electrode assembly is inserted into the lower can, the negative electrode tab may be extended from a side surface of the electrode assembly and bent to be lead to a lower side of the electrode assembly, the positive electrode tab may be extended from the side surface of the electrode assembly and bent to be lead to an upper side of the electrode assembly, and a point at which the negative electrode tab is connected to the side surface of the electrode assembly and a point at which the positive electrode tab is connected to the side surface of the electrode assembly may be disposed to be opposite to each other.

Advantageous Effects

In the present invention having the above-described technical features, when the upper can and the lower can are bonded to each other, the center pin may be elastically compressed so that the center pin allows the negative electrode tab to be in close contact with the lower can and allows the positive electrode tab to be in close contact with the upper can. Thus, the welding process of the negative electrode tab and the positive electrode tab may be removed to simplify the manufacturing process and reduce the defect rate.

Each of the end of the first spring and the end of the second spring may be provided with the wedge having the sharp shape of which a diameter gradually decreases toward the end thereof, and thus, the center pin may be minimized in contact area with the negative electrode tab and the positive electrode tab. Thus, the occurrence of the leakage current and the increase in resistance may be prevented.

The two wedges may be disposed on the ends of each of the first spring and the second spring to prevent the shaking and bending from occurring.

In addition, the length and the elasticity of each of the first spring and the second spring may be determined within the range in which one or more of the positive electrode tab and the negative electrode tab are separated from the upper can or the lower can before the upper can and the lower can are completely separated from each other. Therefore, when the swelling occurs, the positive electrode tab and the upper can, or the negative electrode tab and the lower can may be spaced apart from each other to interrupt the current, thereby preventing the explosion or the fire due to the high temperature from occurring.

The gasket may be configured to not only insulate the electricity, but also to prevent the built-in electrolyte from leaking, and to contain the adhesion component so that the upper can and the lower can adhere to each other. That is, the upper can and the lower can may be bonded to each other through the welding, the bonding, the crimping, or the like, and may provide the additional bonding force in addition to the bonding force acting in the main bonding.

BRIEF DESCRIPTION OF THE DRAWINGS

FIG. 3 is a cross-sectional view illustrating a state in which the secondary battery illustrated in FIG. 2 is disassembled.

MODE FOR CARRYING OUT THE INVENTION

Figure 1:
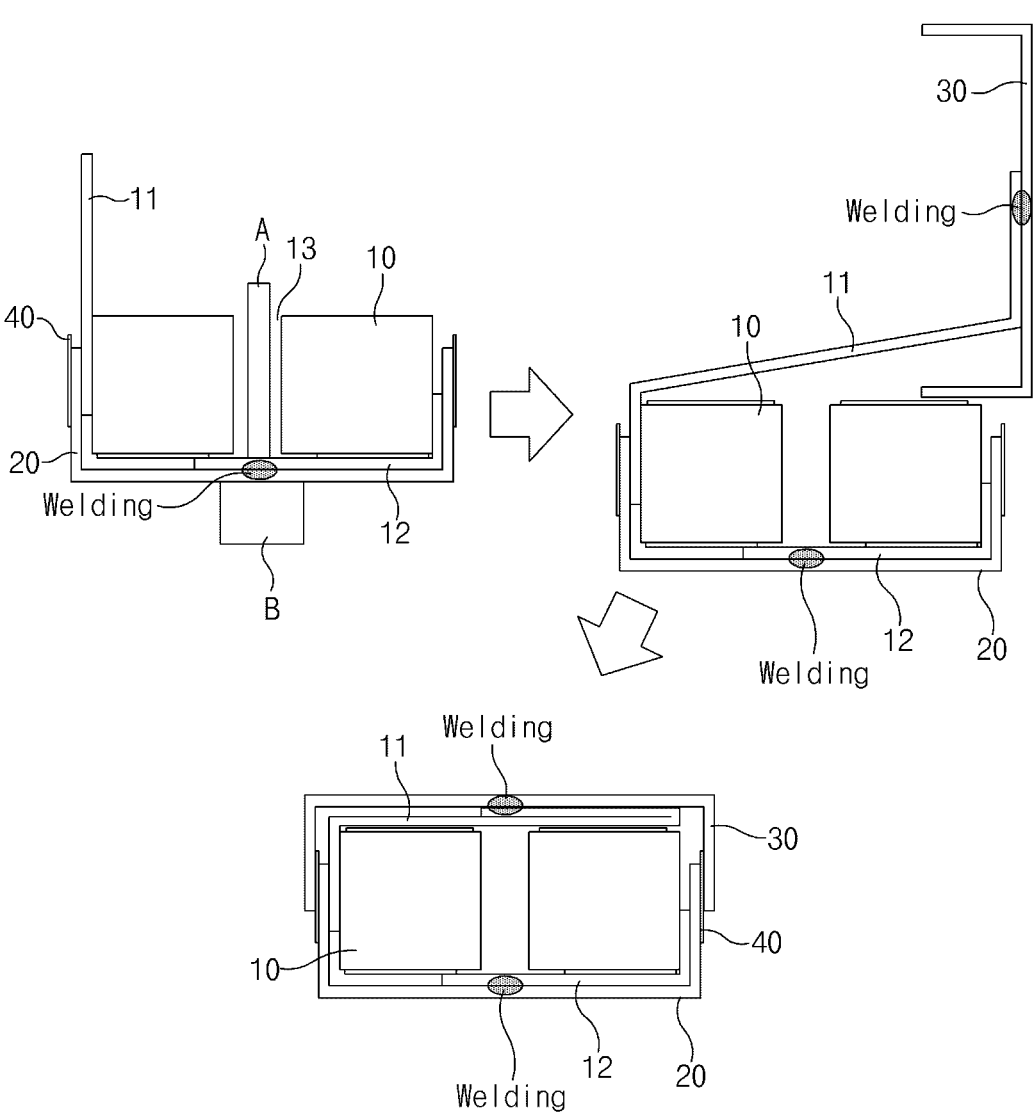
FIG. 1 is a cross-sectional view illustrating a state in which a negative electrode tab and a lower can are welded to each other, and the positive electrode tab and an upper can are welded to each other, and then, the lower can and the upper can are coupled to each other in a process of assembling a button-type secondary battery according to a related art.

Hereinafter, preferred embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein.

In order to clearly describe the present invention, parts irrelevant to the description are omitted, and the same reference numerals are assigned to the same or similar components throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention relates to a button-type secondary battery that is provided to solve the problems such as a decrease in production rate, an increase in product cost due to an increase in length of a positive electrode tab, and an increase in thickness due to additional bending. Hereinafter, preferred embodiments of the present invention will be described in more detail with reference to the accompanying drawings.

Figure 2:
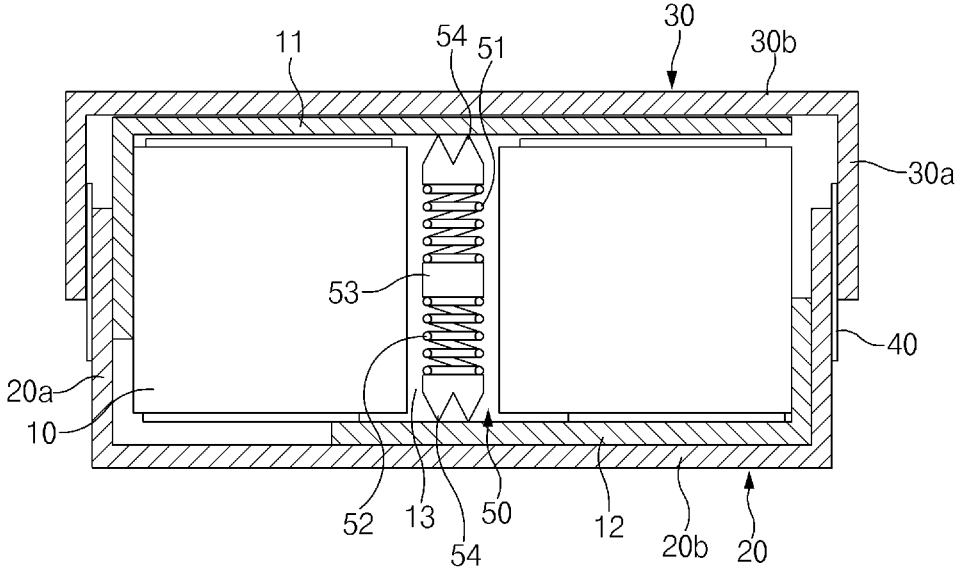
FIG. 2 is a cross-sectional view a secondary battery according to the present invention.

FIG. 2 is a cross-sectional view a secondary battery according to the present invention, and FIG. 3 is a cross-sectional view illustrating a state in which the second battery illustrated in FIG. 2 is disassembled. As illustrated in the drawings, a secondary battery according to the present invention comprises an electrode assembly 10, an upper can 30, a lower can 20, and a center pin 50.

The electrode assembly 10 has a structure in which a positive electrode, a separator, and a negative electrode are stacked, a positive electrode tab 11 protrudes to one side, a negative electrode tab 12 protrudes to the other side, and a through-hole 13 is formed in a center thereof. In more detail, the electrode assembly 10 has a cylindrical shape of which a diameter is greater than a height, and the through-hole 13 is formed at a position passing through the center of the electrode assembly 10.

In addition, the positive electrode tab 11 protrudes upward from one side of a side surface of the electrode assembly 10, and the negative electrode tab 12 protrudes downward from the other side of the side surface. When the upper can 30 is bonded to the lower can 20 in a state in which the electrode assembly 10 is inserted into the lower can 20, the negative electrode tab 12 is bent to be lead to a lower side of the electrode assembly 10, and the positive electrode tab 11 is bent to be lead to an upper side of the electrode assembly 10.

Furthermore, the negative electrode tab 12 and the positive electrode tab 11 may be disposed at sides opposite to each other in the electrode assembly 10. In some case, the negative electrode tab 12 and the positive electrode tab 11 may be disposed closer to each other (for example, the negative electrode tab 12 and the positive electrode tab 11 may be disposed at points at which the negative electrode tab 12 and the positive electrode tab 11 form a right angle with respect to the through-hole).

In addition, the upper can 30 and the lower can 20 have flat planar portions 20*b* and 30*b* and circumferential portions 20*a* and 30*a* protruding in a vertical direction along edges of the planar portions 20*b* and 30*b*, respectively.

Each of the upper can 30 and the lower can 20 is formed in the form of a petri dish in which a diameter of each of the planar portions 20*b* and 30*b* is greater than a height of each of the circumferential portions 20*a* and 30*a*, and the upper can 30 has a diameter that is approximately as large as a thickness of the lower can 20 so that the lower can 20 is fitted into the upper can 30. Thus, the circumferential portion 20*a* of the lower can 20 may enter and be fixed to the inside of the circumferential portion 30*a* of the upper can 30.

Figure 4:
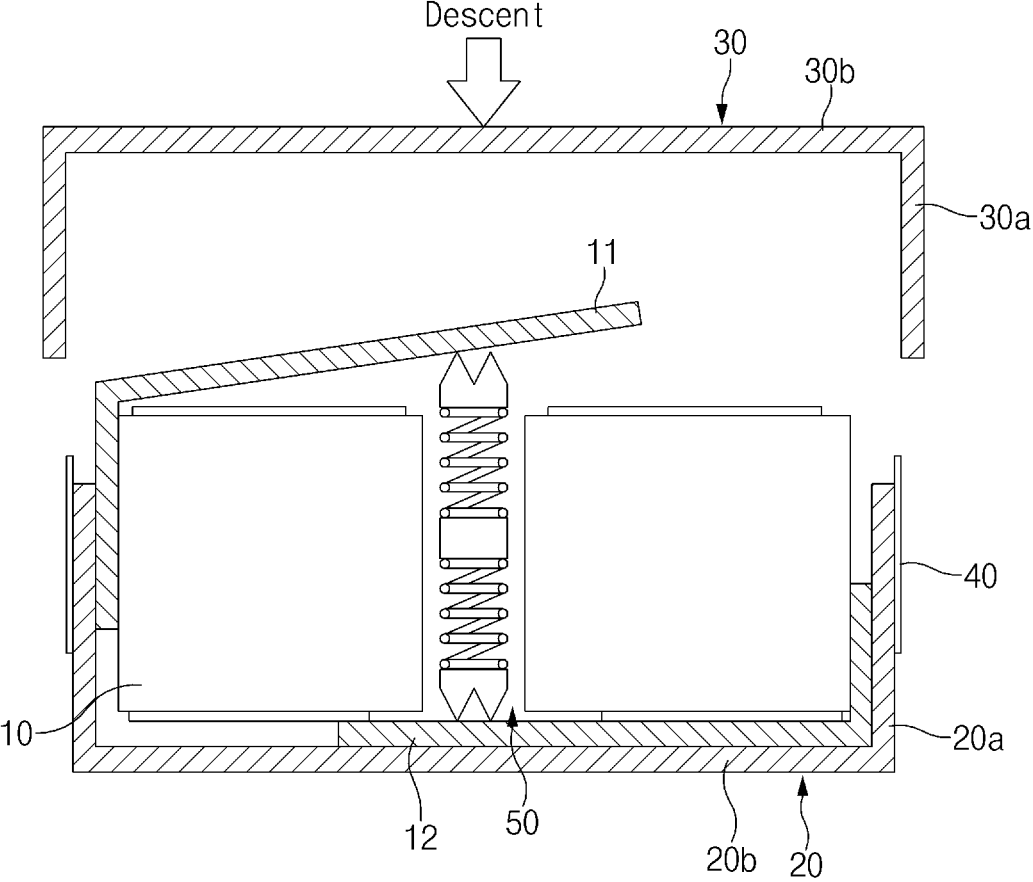
FIG. 4 is a cross-sectional view illustrating a state before an upper can descends to be bonded to a lower can.

Also, the center pin 50 is inserted into the through-hole 13 of the electrode assembly 10 to press the bent positive electrode tab 11 upward and press the bent negative electrode tab 12 downward. As illustrated in FIG. 4 illustrating a state before the upper can 30 descends to be bonded to the lower can 20, in a state in which the center pin 50 is disposed between the positive electrode tab 11 and the negative electrode tab 12, the center pin 50 is elastically compressed by a pressure applied when the upper can 30 and the lower can 20 are bonded to each other. As a result, the center pin 50 presses the positive electrode tab 11 and the negative electrode tab 12 so that the positive electrode tab 11 and the negative electrode tab 12 are in close contact with the planar portions 20*b* and 30*b* of the upper can 30 and the lower can 20, respectively.

That is, in a state in which a bent portion of the negative electrode tab 12 is disposed parallel to the planar portion 20*b* of the lower can 20, and a bent portion of the positive electrode tab 11 is disposed parallel to the planar portion 30*b* of the upper can 30, since the center pin 50 configured to apply elastic restoring force in a longitudinal direction presses the negative electrode tab 12 and the positive electrode tab 11 to be in close contact with the lower can 20 and the upper can 30, a process of welding each of the negative electrode tab 12 and the positive electrode tab 11 is unnecessary in the configuration of the present invention.

In the center pin 50 according to the present invention, two springs 51 and 52 that resist the compression force are connected to each other, and the springs are insulated from each other by an insulator 53 disposed therebetween.

That is, the springs comprise a first spring 51 and a second spring 52, which are disposed to be connected to each other in the longitudinal direction, and the insulator 53 that interrupts electricity is disposed between to insulate the first spring 51 and the second spring 52 from each other. Here, it is preferable that the first spring 51 and the second spring 52 are made of the same material and have the same size so as to have the same elastic restoring force. The insulator 53 is manufactured to have rigidity that is capable of sufficiently supporting a connection point between the first spring 51 and the second spring 52.

Furthermore, in the present invention, each of an end of the first spring 51 pressing the positive electrode tab 11 and an end of the second spring 52 pressing the negative electrode tab 12 is provided with a wedge 54 having a sharp shape of which a diameter gradually decreases toward an end thereof to minimize the contact between the first spring 51 and the positive electrode tab 11 and between the second spring 52 and the negative electrode tab 12, thereby suppressing leakage of current and preventing resistance from increasing.

The wedge 54 has mechanical properties that do not damage a surface when being in contact with each of the positive electrode tab 11 and the negative electrode tab 12. Also, two wedges 54 are disposed parallel to each other at the end of each of the first spring 51 and the second spring 52 to disperse the pressure (alternatively, the wedge 54 may be provided more than two and may be provided in not only the wedge type, but also other shapes such as an edge type).

Furthermore, the present invention has a structure, in which a length of each of the first spring 51 and the second spring 52 and a length of each of the positive electrode tab 11 and the negative electrode tab 12 are limited to suppress interruption of current before heat generation or explosion occurs when an internal temperature increases due to overcharging and the like to vaporize an electrolyte.

Figure 5:
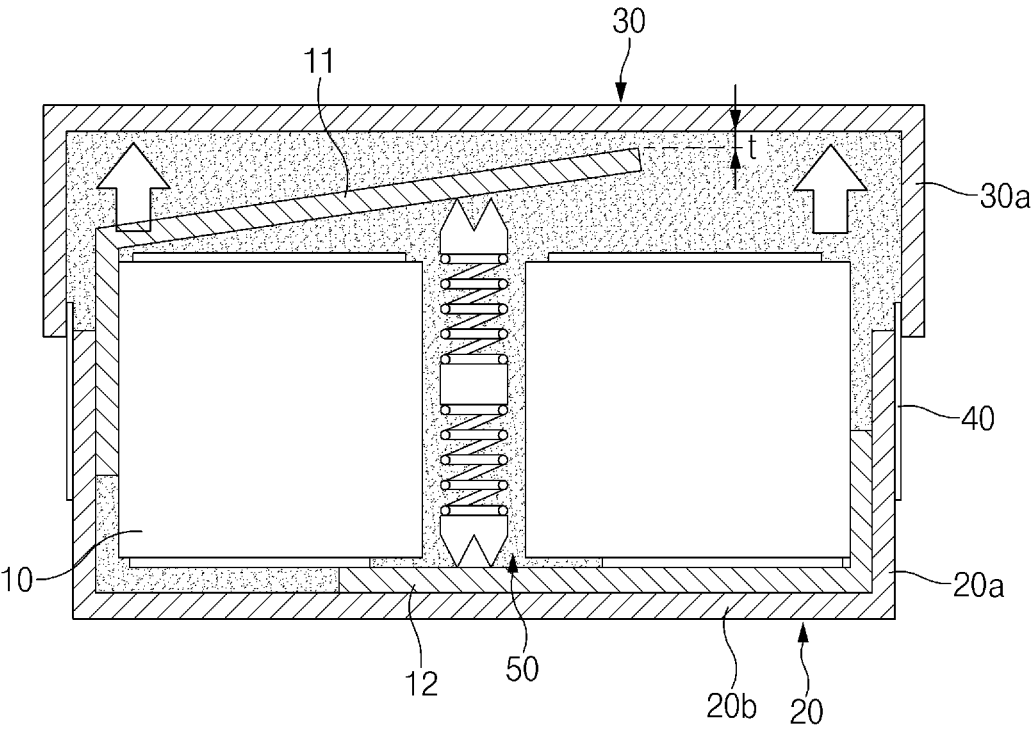
FIG. 5 is a cross-sectional view illustrating a state in which a positive electrode tab and an upper can are spaced apart from each other when an internal pressure increases in a state, in which the upper can and the lower can are bonded to each other, to allow the upper can to move by a specific distance spaced apart from the lower can.

That is, when the pressure inside each of the upper can 30 and the lower can 20 increases to allow the upper can 30 to move by a specific distance from the lower can 20 in the state in which the upper can 30 and the lower can 20 are bonded to each other, referring to FIG. 5 that illustrates a state in which the positive electrode tab 11 and the upper can 30 are spaced apart from each other, when heat generation occurs due to an abnormal operation of the secondary battery, and thus, the internal electrolyte is vaporized by the heat to increase in internal pressure, the upper can 30 and the lower can 20 are separated from each other to move in the vertical direction.

When each of the upper can 30 and the lower can 20 moves by a predetermined distance before the upper can 30 and the lower can 20 are completely separated from each other, in the secondary battery according to the present invention, as illustrated in FIG. 5, the positive electrode tab 11 and the upper can 30 are spaced a distance 't' from each other to interrupt the current. Since the current is interrupted before the upper can 30 and the lower can 20 are completely separated from each other, the heat generation may be suppressed, and the increase in internal pressure may be stopped, and thus, the explosion of the secondary battery may be suppressed. Here, the distance 't' may be determined in a design step. Also, the length and the elasticity of each of the first spring 51 and the second spring 52 may be set, and the length of each of the positive electrode tab 11 and the negative electrode tab 12 may be determined according to the distance 't'.

That is, the length and the elasticity of each of the first spring 51 and the second spring 52 may be determined within the range in which one or more of the positive electrode tab 11 and the negative electrode tab 12 are separated from the upper can 30 or the lower can 20 before the upper can 30 and the lower can 20 are completely separated from each other.

In addition, in the present invention, when the upper can 30 and the lower can 20 are bonded to each other, a gasket 40 that electrically insulates the upper can 30 and the lower can 20 from each other is disposed between a circumferential portion 30*a* of the upper can 30 and a circumferential part 20*a* of the lower can 20. The gasket 40 may be configured to not only insulate the electricity, but also to prevent the built-in electrolyte from leaking, and to contain the adhesion component so that the upper can 30 and the lower can 20 adhere to each other.

For example, the upper can 30 and the lower can 20 may be mainly bonded to each other through welding or crimping, which is a typical bonding method. Alternatively, an adhesion component may be added to the gasket 40 to provide additional bonding force in addition to the main bonding.

In the present invention having the above-described technical features, when the upper can 30 and the lower can 20 are bonded to each other, the center pin may be elastically compressed so that the center pin 50 allows the negative electrode tab 12 to be in close contact with the lower can 20 and allows the positive electrode tab 11 to be in close contact with the upper can 30. Thus, the welding process of the negative electrode tab 12 and the positive electrode tab 11 may be removed to simplify a manufacturing process and reduce a defect rate.

Each of the end of the first spring 51 and the end of the second spring 52 may be provided with the wedge 54 having the sharp shape of which a diameter gradually decreases toward the end thereof, and thus, the center pin 50 may be minimized in contact area with the negative electrode tab 12 and the positive electrode tab 11. Thus, the occurrence of the leakage current and the increase in resistance may be prevented.

Two wedges 54 may be disposed on the ends of each of the first spring 51 and the second spring 52 to prevent shaking and bending from occurring.

In addition, the length and the elasticity of each of the first spring 51 and the second spring 52 may be determined within the range in which one or more of the positive electrode tab 11 and the negative electrode tab 12 are separated from the upper can 30 or the lower can 20 before the upper can 30 and the lower can 20 are completely separated from each other. Therefore, when swelling occurs, the positive electrode tab 11 and the upper can 30, or the negative electrode tab 12 and the lower can 20 may be spaced apart from each other to interrupt the current, thereby preventing explosion or fire due to a high temperature from occurring.

The gasket 40 may be configured to not only insulate the electricity, but also to prevent the built-in electrolyte from leaking, and to contain the adhesion component so that the upper can and the lower can adhere to each other. That is, the upper can 30 and the lower can 20 may be bonded to each other through the welding, the bonding, the crimping, or the like, and may provide the additional bonding force in addition to the bonding force acting in the main bonding.

While the embodiments of the present invention have been described with reference to the specific embodiments, it will be apparent to those skilled in the art that various changes and modifications may be made without departing from the spirit and scope of the invention as defined in the following claims.

DESCRIPTION OF THE SYMBOLS

10: Electrode assembly
11: Positive electrode tab
12: Negative electrode tab
20: Lower can
30: Upper can
50: Center pin

The invention claimed is:

1. A secondary battery comprising:
an electrode assembly having a positive electrode, a separator, a negative electrode, a positive electrode tab protruding to a first side, a negative electrode tab protruding to a second side opposite the first side, and a through-hole extending through the positive electrode, the separator, and the negative electrode, which are stacked;
an upper can having a flat planar portion and a circumferential portion protruding in a vertical direction along an edge of the flat planar portion;
a lower can having a flat planar portion and a circumferential portion protruding in the vertical direction along an edge of the flat planar portion, wherein the circumferential portion of the lower can is fitted in parallel with the circumferential portion of the upper can; and
a center pin in the through-hole, the center pin being configured to apply elastic force in the vertical direction, the center pin comprising:
a first spring;
a second spring; and
an insulator disposed between and connecting the first spring and the second spring in a vertical direction, the insulator being configured to interrupt electricity to electrically insulate the first spring and the second spring from each other,
wherein the first spring and the second spring are configured to resist compression force, and
wherein, in a state in which a portion of the negative electrode tab is disposed parallel to the flat planar portion of the lower can, and a portion of the positive electrode tab is disposed parallel to the flat planar portion of the upper can, when the upper can and the lower can are bonded to each other, the center pin applies the elastic force to allow the portion of the negative electrode tab to be in direct contact with the lower can and allow the portion of the positive electrode tab to be in direct contact with the upper can.

2. The secondary battery of claim 1, wherein, when the upper can and the lower can are bonded to each other, the compression force is applied to the first spring and the second spring.

3. The secondary battery of claim 2, wherein each of an end of the first spring pressing the positive electrode tab and an end of the second spring pressing the negative electrode tab has a wedge, each wedge having a sharp shape of which a diameter gradually decreases toward an end thereof.

4. The secondary battery of claim 2, wherein each of an end of the first spring pressing the positive electrode tab and an end of the second spring pressing the negative electrode tab has two wedges disposed in parallel with each other.

5. The secondary battery of claim 2, wherein a length and elasticity of each of the first spring and the second spring are determined within a range in which one or more of the positive electrode tab and the negative electrode tab are separated from the upper can or the lower can before the upper can and the lower can are completely separated from each other.

6. The secondary battery of claim 5, wherein, when the upper can ascends by a predetermined distance from an initial position thereof bonded to the lower can, the positive electrode tab is switched from a state in which the portion of the positive electrode tab is in direct contact with a bottom surface of the upper can into a state in which the portion of the positive electrode tab is not in direct contact with the bottom surface of the upper can.

7. The secondary battery of claim 1, wherein a gasket that interrupts electricity is disposed between the circumferential portion of the upper can and the circumferential portion of the lower can.

8. The secondary battery of claim 7, wherein the circumferential portion of the upper can has an outer diameter greater than an inner diameter of the circumferential portion of the lower can, and the circumferential portion of the lower can fits within the circumferential portion of the upper can.

9. The secondary battery of claim 8, wherein each of the upper can and the lower can is shaped such that a diameter of the flat planar portion thereof is greater than a height of the circumferential portion thereof.

10. The secondary battery of claim 1, wherein the electrode assembly has a cylindrical shape, and the through-hole is formed at a position passing through a center of the electrode assembly.

11. The secondary battery of claim 1, wherein, when the upper can is bonded to the lower can in a state in which the electrode assembly is inserted into the lower can, the negative electrode tab is extended from a side surface of the electrode assembly and bent to be lead to a lower side of the electrode assembly, the positive electrode tab is extended from the side surface of the electrode assembly and bent to be lead to an upper side of the electrode assembly, and a point at which the negative electrode tab is connected to the side surface of the electrode assembly and a point at which the positive electrode tab is connected to the side surface of the electrode assembly are opposite to each other.

* * * * *